United States Patent
Stierle et al.

(10) Patent No.: US 7,142,288 B2
(45) Date of Patent: Nov. 28, 2006

(54) MEASURING DEVICE FOR CONTACTLESS DISTANCE MEASUREMENT

(75) Inventors: Joerg Stierle, Waldenbuch (DE); Peter Wolf, Leinfelden-Echterdingen (DE)

(73) Assignee: Robert Bosch GmbH, Stuttgart (DE)

( * ) Notice: Subject to any disclaimer, the term of this patent is extended or adjusted under 35 U.S.C. 154(b) by 228 days.

(21) Appl. No.: 10/495,810

(22) PCT Filed: Oct. 11, 2002

(86) PCT No.: PCT/DE02/03872

§ 371 (c)(1),
(2), (4) Date: May 17, 2004

(87) PCT Pub. No.: WO03/046604

PCT Pub. Date: Jun. 5, 2003

(65) Prior Publication Data

US 2004/0263825 A1 Dec. 30, 2004

(30) Foreign Application Priority Data

Nov. 22, 2001 (DE) ................................ 101 57 378

(51) Int. Cl.
*G01C 3/08* (2006.01)
(52) U.S. Cl. .................... 356/4.01; 356/3.01; 356/4.01; 356/5.01
(58) Field of Classification Search ................ 356/4.01
See application file for complete search history.

(56) References Cited

U.S. PATENT DOCUMENTS 5,488,468 A * 1/1996 Kawanishi et al. ........ 356/4.01
5,517,297 A   5/1996 Stenton
5,767,953 A   6/1998 McEwan
6,137,564 A  10/2000 Schmidt et al.
6,336,277 B1  1/2002 Sprenger
6,556,283 B1* 4/2003 Shirai et al. ............... 356/5.01

FOREIGN PATENT DOCUMENTS

| DE | 196 52 438 A1 | 6/1998 |
| DE | 198 04 051 A1 | 8/1999 |
| DE | 198 04 059 A  | 8/1999 |
| EP | 0 738 899 A   | 10/1996 |

* cited by examiner

*Primary Examiner*—Thomas H. Tarcza
*Assistant Examiner*—Luke D. Ratcliffe
(74) *Attorney, Agent, or Firm*—Michael J. Striker

(57) ABSTRACT

A measuring device for contactless distance measurement is disclosed, which has an optical transmission path (12), with an optical transmitter (22), and an optical receiver (13), with a receiving optical element (29) and an optical receiver (30), as well as an equipment module (11) that receives these components of the transmission and reception paths (12, 13). To maintain high measurement precision over the entire temperature range, the components of the transmission and reception paths (12, 13) are placed such that upon a temperature-dictated curvature of the equipment module (11) in the direction of the optical axes (121, 131) of the transmission and reception paths (12, 13), the optical axes (121, 131) are deflected in the same direction by the same amount. For this purpose, the transmission and reception paths (12, 13) are preferably convoluted such that the transmitter (22) and receiver (30) are both located on the same flat fastening face, fixed in the equipment module (11), the fastening face preferably being a printed circuit board (15) for receiving electronic components (FIG. 2).

14 Claims, 2 Drawing Sheets

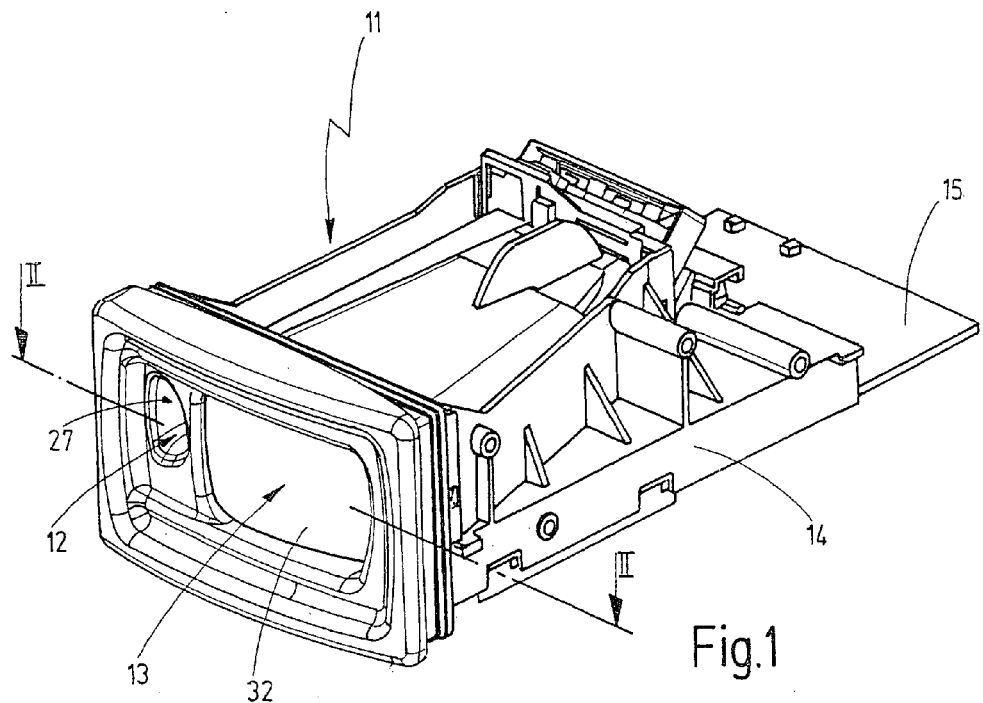
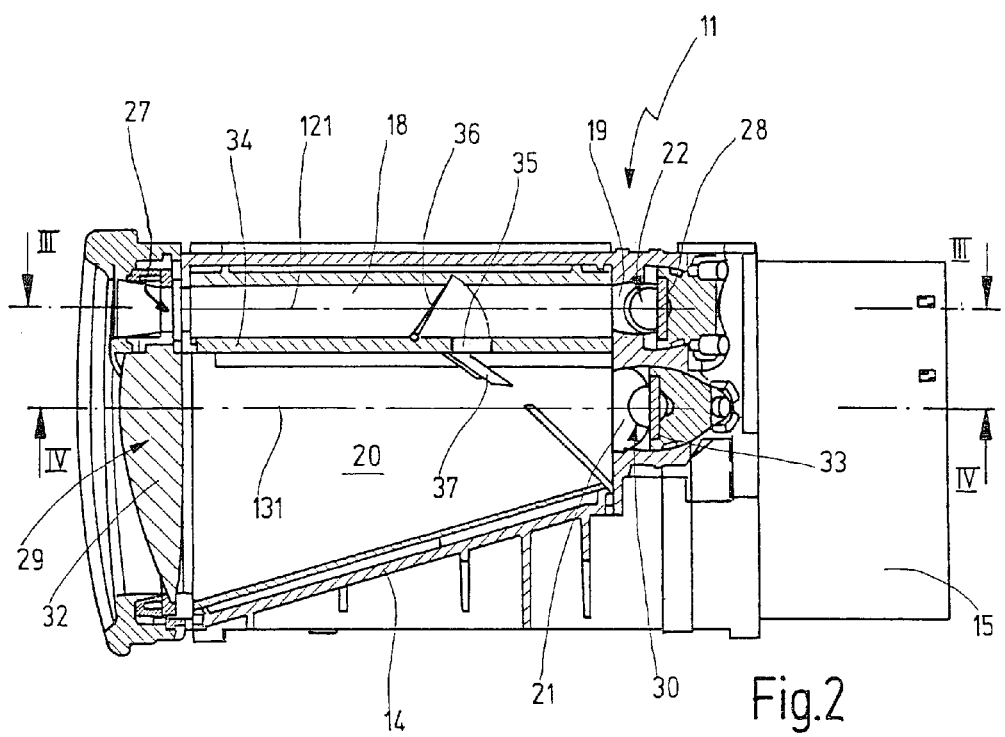

MEASURING DEVICE FOR CONTACTLESS DISTANCE MEASUREMENT

BACKGROUND OF THE INVENTION

The invention relates to a measuring device for contactless distance measurement, in particular a handheld device.

One such measuring device, designed as a handheld device and also known as a distance measuring device, is known for instance from German Patent Disclosure DE 198 04 051 A1 or German Patent DE 196 52 438 C2. The measuring device operates on the principle of transit time measurement, in that a light signal or light pulse is transmitted from the transmission path to the appropriate object, and this signal or pulse is reflected from the object and received again by the measuring device via the reception path, and the transit time of the light signal or pulse, which is the period of time between the instant of transmission and the instant of reception, is measured. This period of time is a measure for the distance, which is calculated taking the speed of light into account and is shown on a display. The transit time can be determined for instance by correlating the transmission and reception signals.

SUMMARY OF THE INVENTION

The measuring device for contactless distance measurement according to the invention has the advantage that because of the placement according to the invention of the components, it is attained that over the entire temperature range, the light spot produced on an appropriate object by the optical transmission path is replicated in the optical reception path and is thus seen. Hence a temperature-caused curvature of the equipment module that carries the components does not affect the measurement operation, and via the optical reception path, the maximum possible light intensity of the beam transmitted over the optical transmission path is always received, so that the measurement sensitivity of the measuring device is also preserved over the entire temperature range.

In a preferred embodiment of the invention, the transmission and reception paths are optically convoluted such that the transmitter and the receiver are both located in the same flat fastening face, which is fixed in the equipment module. By the convolution of the two optical paths, on the one hand the receiving optical element can be shorter, but on the other, without additional optical components, such as optical waveguides that markedly reduce the efficiency of the receiving optical element, the transmitter and receiver can be placed in the same fastening face. If the equipment module curves in response to temperature, then the fastening face fixed on it also curves, and the light spot generated by the transmitter on the object being measured, and the field of view of the receiver on the object being measured, migrate in the same way. The light spot and field of view thus remain congruent even if the temperature changes.

In an advantageous embodiment of the invention, the equipment module has an optical element mount and a printed circuit board that is firmly connected to the optical element mount and that forms the fastening face for the optical transmitter and the optical receiver. The optical convolution of the transmission and reception paths is done by means of a deflecting mirror disposed in the optical element mount. Because the transmitter and receiver, including their electronic components, are accommodated on the same printed circuit board, automatic contacting of the transmitter and receiver and their components is possible in a way that is simple from a production standpoint, and at the same time simple shielding from the outside environment is feasible, especially if in an advantageous embodiment of the invention the electronic components are disposed on the underside, toward the optical element mount, of the printed circuit board. Then, such shielding can be realized in a simple way by a shielding layer in the preferably multi-layer printed circuit board, which is connected electrically conductively to the optical element mount at least one point.

In a preferred embodiment of the invention, the printed circuit board extends as parallel as possible to a plane that extends through the optical axes of the transmission and reception paths. As a result, the available installation space in the equipment module is optimally utilized, and the free back side of the printed circuit board can be used to accommodate operator control elements and displays.

In an advantageous embodiment of the invention, the deflecting mirror is designed as an optical filter, in order to limit the bandwidth of the light reflected from the appropriate object and received by the optical receiver.

In an advantageous embodiment of the invention, the transmission and reception paths are separated from one another by chambers and channels embodied in the optical element mount, so that on the one hand no light from the transmission beam reaches the receiver, and on the other, by electrical shielding, crosstalk between the signals on the transmitter and receiver sides is markedly reduced.

In an advantageous embodiment of the invention, a closable window is provided in a partition in the optical element mount that separates the channel for the transmission path from the channel for the reception path. Furthermore, a deflecting element is disposed in the channel for the transmission path and is pivotable into the transmission path in such a way that a transmitted light beam striking the deflecting element is introduced through the window into the reception path. Most preferably, the deflecting element, in its position pivoted out of the transmission path, closes the window in the partition between the two channels. This mechanism is intended for purposes of a reference measurement, so that the measuring device can be calibrated accordingly.

The invention is described in further detail in the ensuing description in terms of an exemplary embodimnt shown in the drawing.

BRIEF DESCRIPTION OF THE DRAWINGS

FIG. 1, a perspective view from below of an equipment module with the components of the transmission and reception paths of a distance measuring device;

FIG. 2, a section taken along the line II—II in FIG. 1;

DESCRIPTION OF THE PREFERRED EMBODIMENTS

Figure 3:
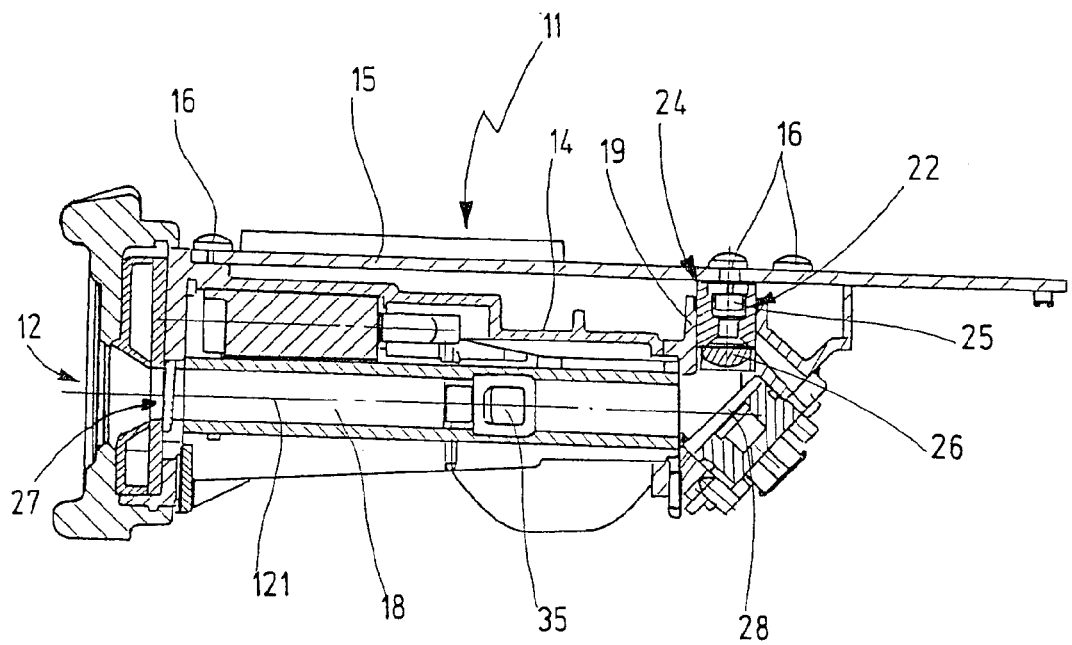
FIG. 3, a section taken along the line III—III in FIG. 2.
Figure 4:
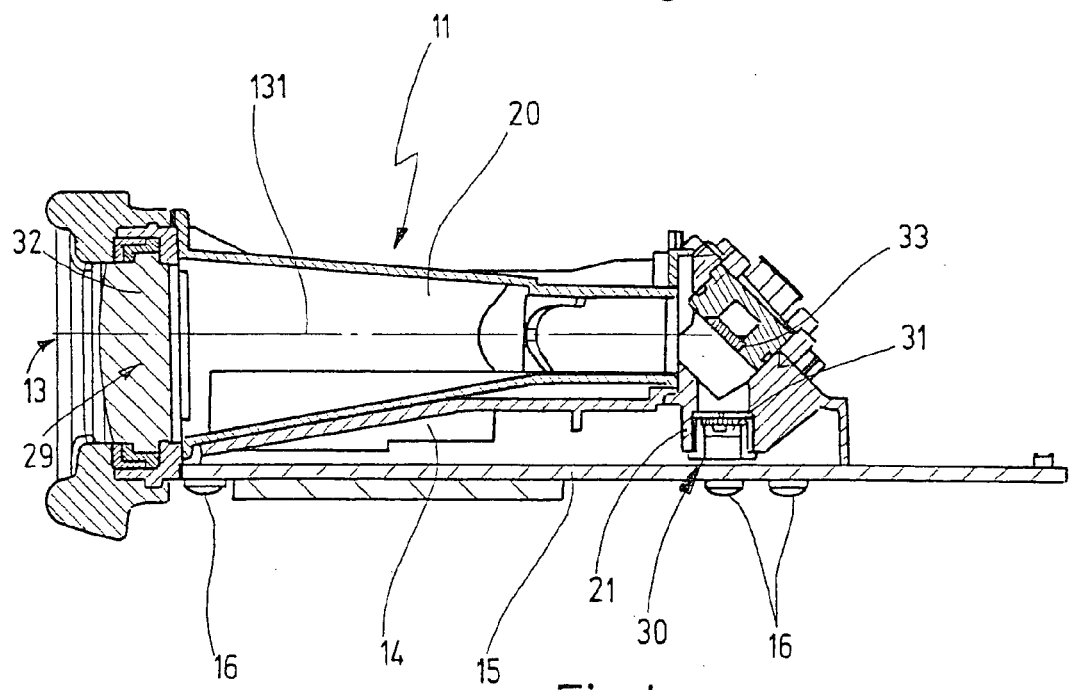
FIG. 4, a section taken along the line IV—IV in FIG. 2.

The equipment module 11, which can be seen in perspective from below in FIG. 1 and in various sectional views in FIGS. 2–4, and which once the measuring device has been completely assembled is enclosed by a housing, carries the components for embodying an optical transmission path 12 and an optical reception path 13. The equipment module 11 has an optical element mount 14 and a printed circuit board 15 that is secured to the optical element mount 14 by means of screws 16 (FIGS. 3 and 4). The printed circuit board 15 is disposed on the optical element mount 14 as parallel as possible to a plane that extends through the optical axes 121 and 131 (FIG. 2) of the transmission path 12 and reception path 13, and in FIG. 2 it coincides with the plane of the paper. The transmission and reception paths 12, 13 are separated from one another by channels and chambers 18-21 embodied in the optical element mount 14. In FIG. 3, the transmission channel 18 and the transmission chamber 19, which is oriented perpendicular to the transmission channel 18, can be seen, and in FIG. 4, the reception channel 20 and the reception chamber 21, which is likewise oriented perpendicular to the reception channel 20, can be seen. In a sectional view of FIG. 2, the disposition of the transmission channel 18 and reception channel 20 in the optical element mount 14 can be seen.

The components of the optical transmission path 12 include an optical transmitter 22, which is embodied as a collimator 24 with a laser diode 25 and a collimator lens 26 (FIG. 3); a cover disk 27 of glass, which closes off the transmission channel 18 at the front; and a deflecting mirror 28, disposed on the other end of the transmission channel 18, which is retained adjustably on the optical element mount 14. The optical axis 121 of the transmission path 131 can be adjusted via the deflecting mirror 28.

The components of the optical reception path 13 include a receiving optical element 29 and a receiver 30, downstream of it, which is embodied here as a light detector 31 (FIG. 4). The receiving optical element 29 comprises a receiver lens, closing off the reception channel 20 at the front, with a long focal length, and a deflecting mirror 33, which is placed on the other end of the reception channel 20 and is retained adjustably in the optical element mount 14. Via the deflecting mirror 33, both the focal point and the direction of the ok 131 of the reception path 13 can be varied and adjusted.

Both the collimator 24 and the light detector 31 are secured to the printed circuit board 15, specifically on the underside, toward the optical element mount 14, and are put into contact there with further electronic components, not shown here, of the transmitter 22 and receiver 30 that are also located on the underside of the printed circuit board 15. The shielding of the transmitter 22 and receiver 30 and electronic components from the outside is effected by a shielding layer, not shown here, in the printed circuit board 15, which is embodied as multi-layered and is connected electrically conductively at least one point to the optical element mount 14. The transmitter 22 and receiver 30 are disposed close together with spacing, transversely to the optical axis 121, 131, and the collimator 24 protrudes into the transmission chamber 19 and the light detector 31 protrudes into the reception chamber 21, and thus the transmitter 22 and receiver 30 are shielded from one another both optically and electrically. Because of this placement of the transmitter 22 and receiver 30, a deformation, resulting from the connection of the printed circuit board 15 and the optical element mount 14, of the optical element mount 14 upon a temperature response that causes a curvature of the optical element mount 14 in the direction of the optical axes 121, 131, the optical axes 121, 131 of the transmission path 12 and reception path 13 are deflected by the same amount in the same direction. As a result, once the transmission path 12 and reception path 13 have been adjusted once and for all by the deflecting mirrors 28, 33, the measurement spot generated on an appropriate object by the transmission path 12 is always fully replicated on the light detector 31 in the reception path 13, so that the curvature of the optical element mount 14 does not affect the measurement precision of the device.

As can be seen in FIGS. 2 and 3, a window 35 is provided in a partition 34 that separates the transmission channel 18 from the reception channel 20, and a deflecting element 36 is disposed pivotably in the transmission channel 18 in such a way that it can be pivoted into the beam path in the transmission channel 18, or in other words into the transmission path 12, and out of the beam path in the transmission channel 18, that is, out of the transmission path 12, again. In the inward-pivoted position, the deflecting element 36 deflects a beam, arriving from the deflecting mirror 28, through the window 35 into the reception channel 20, where the beam, via a reflector 37 (FIG. 2) and the deflecting mirror 33, strikes the light detector 31. In the outward-pivoted position, the deflecting element 36 closes the window 35. This pivoting mechanism of the deflecting element 36 serves to perform a reference measurement, for calibrating the measuring device.

The invention claimed is:

1. A measuring device for contactless distance measurement, in particular a handheld device, having an optical transmission path (12), which has an optical axis (121) and as one component has an optical transmitter (22), having an optical reception path (13), which has an optical axis (131) and as components has a receiving optical element (29) and an optical receiver (30), and having an equipment module (11) that receives the components of the transmission and reception paths (12, 13), characterized by a placement of the components of the transmission path (12) and reception path (13) such that upon a temperature-caused curvature of the equipment module (11) in the direction of the optical axes (121, 131) of the transmission and reception paths (12, 13), the optical axes (121, 131) are deflected by the same amount in the same direction.

2. The measuring device of claim 1, characterized in that the optical transmitter (22) and the optical receiver (30) are disposed on the inside, oriented toward the optical element mount (14), of the printed circuit board (15), transversely to the optical axes (121, 131) of the transmission and reception paths (12, 13), and spaced apart from one another.

3. The measuring device of claim 1, characterized in that the deflecting mirrors (28, 33) are embodied as optical filters.

4. The measuring device of claim 1, characterized in that the optical transmitter (22) and the optical receiver (30) have electronic components, which are disposed on the underside, oriented toward the optical element mount (14) of the printed circuit board (15), and that the printed circuit board (15) has at least one shielding layer for electronic shielding from the outside.

5. The measuring device of claim 4, characterized in that with its shielding layer, the printed circuit board (15) electrically conductively connected to the optical element mount (14) at least one point.

6. The measuring device of claim 1, characterized in that the transmission and reception paths (12,13) are separated from one another by channels (18, 20) and chambers (19, 21) embodied in the optical element mount (14).

7. The measuring device of claim 6, characterized In that the axes of the channels (18, 20) are oriented as parallel as possible to the optical axes (121, 131) of the transmission and reception paths (12, 13).

8. The measuring device of claim 7, characterized in that the channels (18, 20) are closed off at the ends, each by a respective optically transparent element (27, 32).

9. A measuring device for contactless distance measurement, in particular a handheld device, having an optical transmission path (12), which has an optical axis (121) and as one component has an optical transmitter (22), having an optical reception path (13), which has an optical axis (131) and as components has a receiving optical element (29) and an optical receiver (30), and having an equipment module (11) that receives the components of the transmission and reception paths (12, 13), characterized by a placement of the components of the transmission path (12) and reception path (13) such that upon a temperature-caused curvature of the equipment module (11) in the direction of the optical axes (121, 131) of the transmission and reception paths (12, 13), the optical axes (121, 131) are deflected by the same amount in the same direction, wherein the transmission and reception paths are optically convoluted such that the transmitter (22) and the receiver (30) are both located in the same flat fastening face, which is fixed in the equipment module (11), wherein the equipment module (11) has an optical element mount (14) and a printed circuit board (15), which is firmly connected to the optical element mount (14) and forms the fastening face for the optical transmitter (22) and the optical receiver (30), and that for the optical convolution of the transmission and reception paths (12, 13), one deflecting mirror (28, 33) per path is disposed in the optical element mount (14), wherein the transmission and reception paths (12, 13) are separated from one another by channels (18, 20) and chambers (19, 21) embodied in the optical element mount (14), and wherein, a closable window (35) is provided in a partition (34) of the optical element mount (14), which partition separates the channel (18) for the transmission path (12) from the channel (20) for the reception path (13), and a deflecting element (36) is disposed in the channel (18) for the transmission path (12), which deflecting element can be pivoted into the transmission path (12) in such a way that a transmitted light beam, striking the deflecting element (36), is introduced through the window (35) into the reception path (13).

10. The measuring device of claim 9, characterized in that the deflecting element (36), in its position pivoted out of the transmission path (12), closes the window (35) in the partition (34).

11. The measuring device of claim 1, characterized in that the optical transmitter (22) is a collimator (24), with a laser diode (25) and a collimator lens (26).

12. The measuring device of claim 1, characterized in that the optical receiver (30) has a light detector (31).

13. A measuring device for contactless distance measurement, in particular a handheld device, having an optical transmission path (12), which has an optical axis (121) and as one component has an optical transmitter (22), having an optical reception path (13), which has an optical axis (131) and has components has receiving optical element (29) and an optical receiver (30), and having an equipment module (11) that receives in the components of the transmission and reception paths (12, 13), and the equipment module (11) has an optical element mount (14) and a printed circuit board (15) arranged on it, so that the optical transmitter (22) and the optical receiver (30) are jointly arranged on the printed circuit board (15), characterized in that the optical transmission path (12) and the optical reception path (13) are optically convoluted and the mounting of the printed circuit board on the optical mount element (14) is configured so that the optical printed circuit (15) is oriented substantially parallel to a plane extending through the optical axes (121, 131) of the transmission and reception paths (12, 13).

14. The measuring device of claim 13, characterized in that for the optical convolution of the transmission and reception paths (12,13) a corresponding deflecting mirror (28, 33) is arranged in the optical element mount (14).

* * * * *